United States Patent [19]

Koshi et al.

[11] Patent Number: 4,957,366
[45] Date of Patent: Sep. 18, 1990

[54] FLUORESCENCE SPECTROPHOTOMETER AND WAVELENGTH SETTING METHOD THEREFOR

[75] Inventors: Hiroyuki Koshi; Minoru Owada, both of Katsuta; Hisako Minegishi, Mito; Takayuki Ono, Katsuta, all of Japan

[73] Assignee: Hitachi, Ltd., Tokyo, Japan

[21] Appl. No.: 313,440

[22] Filed: Feb. 22, 1989

[30] Foreign Application Priority Data

Feb. 24, 1988 [JP] Japan .................................. 63-39417

[51] Int. Cl.[5] ............................................ G01N 21/64
[52] U.S. Cl. ................................ 356/318; 250/458.1; 250/459.1
[58] Field of Search .............................. 356/317, 318; 250/458.1, 459.1, 461.1, 461.2

[56] References Cited

U.S. PATENT DOCUMENTS 4,330,207  5/1982  Nogami et al. ............. 250/458.1 X Primary Examiner—Vincent P. McGraw
Attorney, Agent, or Firm—Antonelli, Terry, Stout & Kraus

[57] ABSTRACT

In a fluorescence spectrophotometer a first spectrum of fluorescence emitted by a sample in a state where the wavelength of excitation light is fixed to an arbitrary wavelength; a second spectrum of fluorescence emitted by the sample in a state where the wavelength of excitation light is changed to another wavelength; and the wavelength when corresponding peaks in the two spectra are approximately in accordance with each other is set for the fluorescence wavelength emitted by said sample.

11 Claims, 5 Drawing Sheets

FLUORESCENCE SPECTROPHOTOMETER AND WAVELENGTH SETTING METHOD THEREFOR

BACKGROUND OF THE INVENTION

This invention relates to a fluorescence spectrophotometer and in particular to a fluorescence spectrophotometer and a wavelength setting method therefor, which are suitable for setting excitation wavelength and fluorescence wavelength for their optimum wavelengths.

In a fluorescence spectrophotometer the most basic measurement conditions concern the excitation wavelength and the fluorescence wavelength. In order to set them, prior art devices of this kind as disclosed in U.S. Pat. No. 4,330,207 are so constructed that either one of the excitation wavelength and the fluorescence wavelength is fixed, while the other is scanned and set so as to obtain the maximum peak in the spectrum obtained for a sample.

However the prior art techniques described above is based on a thought that the optimum wavelength for a sample is the maximum peak wavelength in the spectrum of the sample. This thought has no inconvenience in the case where the concentration of the sample is high and the sample emits strong fluorescence. However, in the case where the concentration is low or fluorescence emitted by the sample is weak, peaks due to Raman scattering light by the solvent, high order scattering light of the excitation light, etc. are greater than those due to the fluorescence and the optimum wavelength is not always the maximum peak wavelength. Originally a fluorescence spectrophotometer is used often for the purpose of high sensitivity analysis and in many cases the fluorescence of the sample is weak. For this reason, there was a problem that, unless the operator recognizes well that the optimum wavelength is not always the maximum peak wavelength, the function to set automatically the optimum wavelength gives rise rather to erroneous operations for setting the measurement conditions.

SUMMARY OF THE INVENTION

The principal object of this invention is to provide a fluorescence spectrophotometer capable of preventing erroneous operations and setting the excitation wavelength and the fluorescence wavelength for the optimum wavelengths and further a wavelength setting method for the fluorescence spectrophotometer, by which the optimum wavelength can be easily set.

The peak wavelength due to fluorescence doesn't depend on variations in the excitation wavelength, which give rise only to variations in the amount of the fluorescence. On the contrary, when the excitation wavelength varies, the peak wavelength due to the Raman scattering light by the solvent, the high order scattering light, etc. varies correspondingly. A principal feature of this invention consists in that paying attention to such a difference in wavelength variations, the wavelength of either one of the excitation side spectroscope and the fluorescence side spectroscope is fixed to an arbitrary first wavelength and a first spectrum is measured when the other is scanned in wavelength; then the wavelength of the one is fixed to a second wavelength, which is different from the first and a second spectrum is measured again when the other is scanned in wavelength; the peak wavelength of the first spectrum is compared with that of the second; and the excitation or fluorescence wavelength is set, regarding the peak wavelength when they are approximately in accordance with each other as a peak wavelength due to the fluorescence.

Apart from the objects and the features described above, other measures are taken in an embodiment, which will be described in detail below.

DESCRIPTION OF THE PREFERRED EMBODIMENTS

Figure 1:
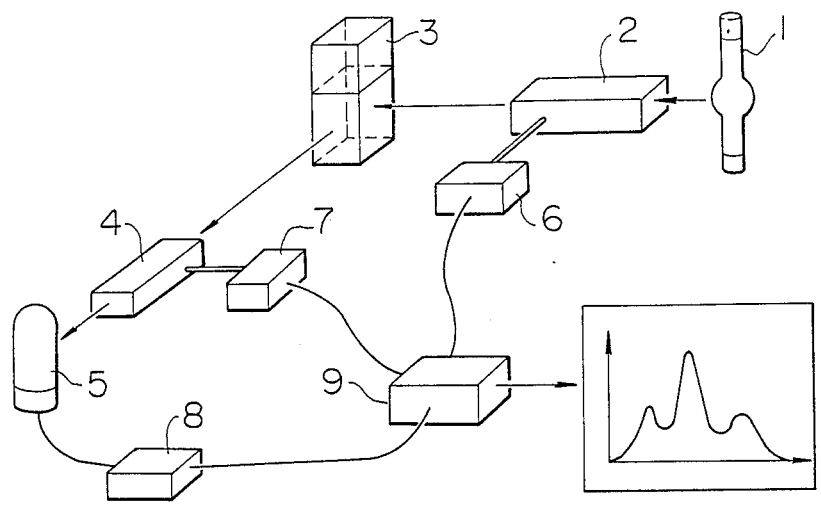
FIG. 1 illustrates the construction of a fluorescence spectrophotometer, which is an embodiment of this invention.

Hereinbelow an embodiment of this invention will be explained, referring to the drawings. In FIG. 1 a light flux emitted by a xenon (Xe) lamp 1 is made monochromatic by an excitation side spectroscope 2 and projected on a sample vessel 3. Fluorescence generated by the sample is selected in the wavelength by a fluorescence side spectroscope 4 and then the intensity thereof is measured by a detector 5. Signals outputted by the detector 5 are sent to a computer 9 for performing data processing after having been amplified by a signal amplifier 8. Further the wavelength of the excitation side spectroscope 2 is controlled by the computer 9 through an excitation side wavelength driving system 6. In the same way the wavelength of the fluorescence side spectroscope 4 is controlled by the computer 9 through a fluorescence side wavelength driving system 7. Here the spectrum obtained by fixing the wavelength of the excitation side spectroscope 2 and by varying the wavelength of the fluorescence side spectroscope 4 is the fluorescence spectrum. In the contrary case the excitation spectrum is obtained. These spectra are inputted in the computer 9 through the detector 5 and the signal amplifier 8. The computer 9 has a function to store these spectra and detects peaks in the spectra.

Figure 2A:
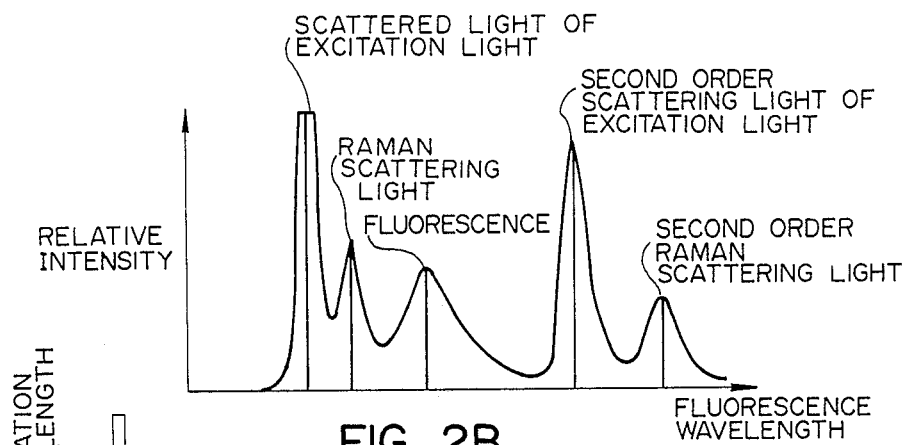
FIG. 2 is a scheme for explaining the basic principle of this invention.
Figure 2B:
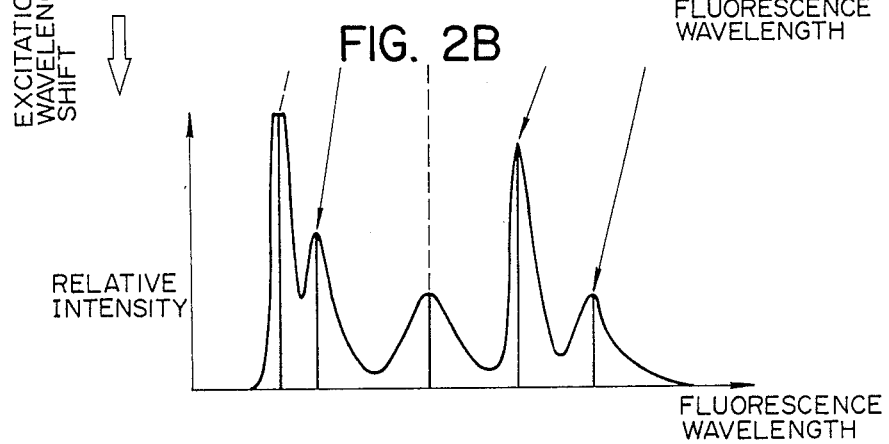

FIG. 2 shows spectra obtained in practice in detail, taking the fluorescence spectrum as an example. The spectrum obtained by the fluorescence spectrophotometer includes scattered light of the excitation light and Raman scattering light apart from the peaks due to the fluorescence. Further, in the case where a spectroscope using a diffraction grating is used, it includes higher order scattering light such as second order scattering light of the excitation light, second order Raman scattering light, etc. In order to find peaks due to the fluorescence, which are objects to be measured, in a spectrum including such a number of peaks, long analysis experience and knowledge on the fluorescence spectrophotometer are required. Therefore it was difficult for beginners to find them. In order to remove this difficulty the fluorescence spectrophotometer according to this invention is constructed so as to have a function to find automatically the peaks due to the fluorescence, which are objects to be measured, in the following way. In order to distinguish the peaks due to the fluorescence from the other, a property is utilized that the wavelength of the peaks due to the fluorescence doesn't vary, when the excitation wavelength is varied, but the wavelength of the other varies, depending on variations in the excitation wavelength.

Figure 3:
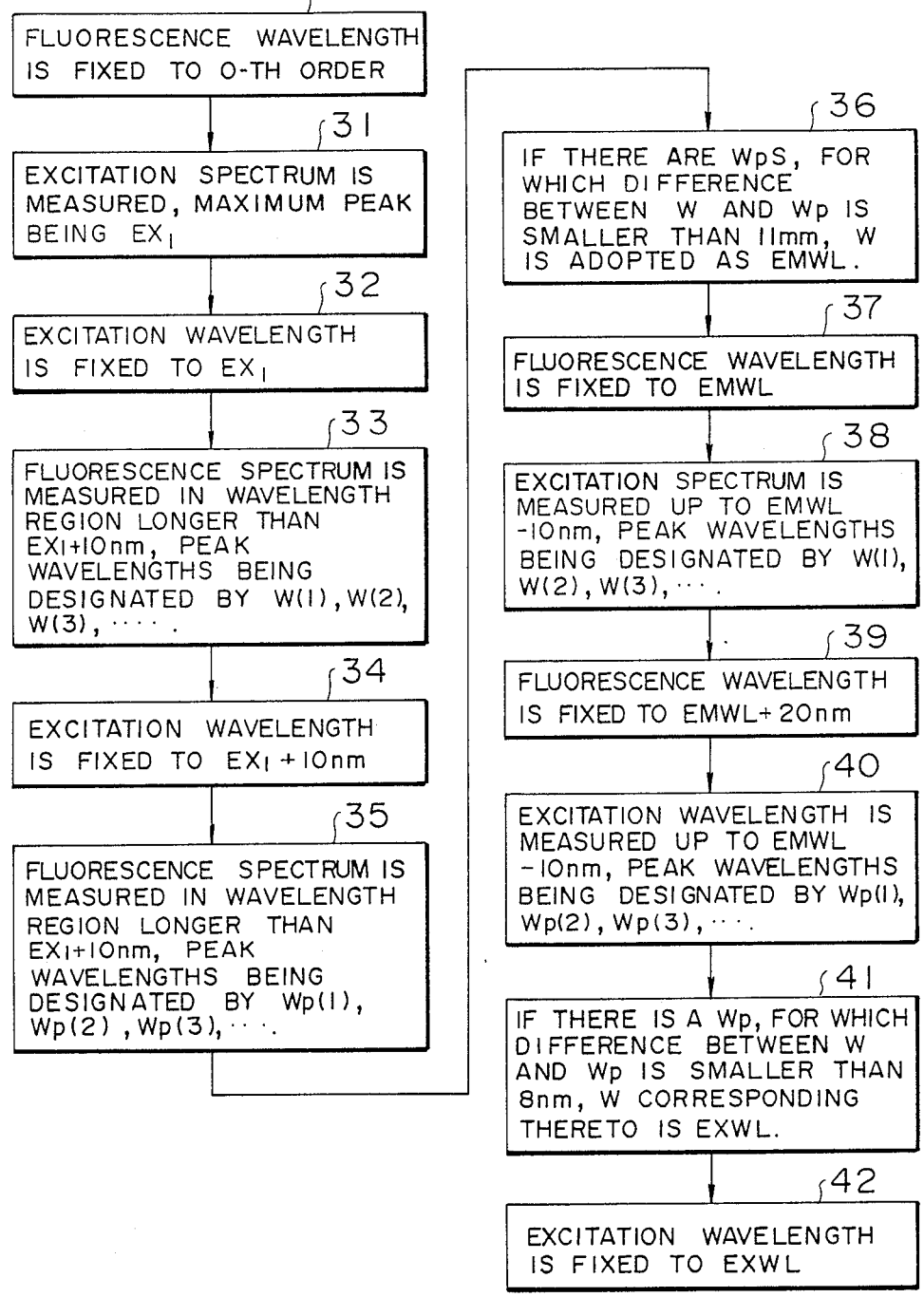
FIG. 3 is a flowchart for setting the wavelength for the fluorescence spectrophotometer, which is the embodiment of this invention.

FIG. 3 shows a flowchart of the computer 9 for distinguishing the peaks due to the fluorescence and setting the excitation wavelength and the fluorescence wavelength for the optimum wavelength of the sample and FIGS. 4A to 4F indicate signal waveform in the course of the processing thereof. At first, in order to find a peak of the excitation wavelength, the fluorescence wavelength is set at the 0-th order and the excitation spectrum is measured (step 30 in FIG. 3). The wavelength of the maximum peak in the obtained spectrum is stored as $EX_1$ (Step 31 in FIG. 3, FIG. 4A). $EX_1$ represents a wavelength provisionally determined and it is not always in accordance with the optimum excitation wavelength.

Next the excitation wavelength is fixed at $EX_1$ (Step 32 in FIG. 3). The fluorescence spectrum is measured in the wavelength region longer than $EX_1 + 10$ nm. It is for the purpose of excluding the peak due to scattered light of the excitation light that the measurement is effected from $EX_1 + 10$ nm. However this difference from $EX_1$ can be selected arbitrarily, depending on various conditions such as the slit width in the fluorescence spectrophotometer. Hereinbelow the explanation is continued, supposing that the slit is 10 nm wide as an example. The peaks in the obtained fluorescence spectrum are searched and numbered as $W(1)$, $W(2)$, ... in the decreasing order. These peak wavelengths are stored (Step 33 in FIG. 3, FIG. 4B). Then the excitation wavelength is fixed at $EX_1 + 10$ nm (Step 34 in FIG. 3) and the fluorescence spectrum is measured again in the wavelength region longer than $EX_1 + 10$ nm. The peaks in the obtained spectrum are numbered as $W_p(1)$, $W_p(2)$, ... and stored (Step 35 in FIG. 3, FIG. 4C). Starting from $W(1)$, $W(1)$, $W(2)$, ... are compared with $W_p(1)$, $W_p(2)$, ..., respectively. If there is a $W_p$, whose difference is smaller than 11 nm, $W(1)$ is stored as the fluorescence side optimum wavelength EMWL. In the case where there is none, $W(2)$, $W(3)$, ... are compared with $W_p$s in this order. In the same way, if there is a $W_p$, whose difference is smaller than 11 nm, $W(2)$, $W(3)$, ... are adopted as EMWL (Step 36 in FIG. 3). It is for the purpose of finding the fluorescence peaks without omission as far as possible, even if fluorescence peaks are superposed on each other and peak wavelengths thereof are shifted, that the peaks are adopted with a margin, i.e. not only the peaks in the spectra indicated in FIGS. 4B and 4C, which are completely in accordance with each other, but also the peaks, which are in accordance with each other within a limit of 11 nm, are adopted. In this example, in the case where the excitation wavelength is varied by 10 nm, the amount of the variation in the second order scattering light of the excitation light is 20 nm; that in the Raman scattering light is 12 nm at 200 nm, which is the smallest wavelength for usual fluorescence spectrophotometers; and that in the second order scattering light is 24 nm. In a longer wavelength region of the excitation light the amount of the shift for the Raman scattering light is still greater. For the reason described above the limit of the margin is determined to be 11 nm. Upto here the optimum wavelength on the fluorescence side was found. Consequently, by setting this optimum wavelength for the peak wavelength due to the fluorescence, it is possible to set it for the appropriate wavelength, even in the case where the concentration of the sample is low.

Furthermore, in this embodiment, in order to set the optimum wavelength on the excitation side, the processing as described below is performed. That is, in order to find the optimum wavelength on the excitation side, the fluorescence wavelength is fixed to EMWL stated above (Step 37 in FIG. 3) and the excitation spectrum is measured to EMWL − 10 nm. The peaks in the obtained spectrum are searched and numbered as $W(1)$, $W(2)$, ... in the decreasing order. The peak wavelengths are stored (Step 38 in FIG. 3, FIG. 4D). Next the fluorescence wavelength is fixed to EMWL + 20 nm (Step 39 in FIG. 3) and the excitation spectrum is measured again upto EMWL − 10 nm. The peaks in the obtained spectrum are numbered as $W_p(1)$, $W_p(2)$, ... and the wavelengths thereof are stored (Step 40 in FIG. 3, FIG. 4E). Similarly to the fluorescence side, Ws are compared with $W_p$s. If there is a $W_p$, for which the difference is smaller than 8 nm, the W corresponding thereto is the excitation side optimum wavelength EXWL (Step 41 in FIG. 3, FIG. 4F). Here it is because the wavelength of the scattered light varies only by ½, i.e. by 10 nm, on the excitation spectrum for an amount of the shift on the fluorescence side that the amount of the shift on the fluorescence side is determined to be 20 nm. For this reason the reference, on the basis of which the optimum wavelength is detected, is determined within a limit of 8 nm.

As described above, it is possible to discern the optimum wavelengths on the excitation and fluorescence sides and to set the excitation and fluorescence wavelengths therefor. At this time it is sufficient to study the optimum values for the references, on the basis of which the amount of the shift, the shift direction and the optimum wavelength on the excitation and fluorescence sides are detected, depending on various conditions of the fluorescence spectrophotometer.

Figure 4A:
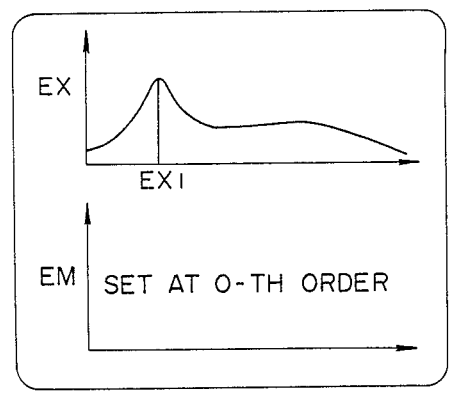
FIGS. 4A to 4F shows waveforms in processings corresponding to different steps in the flowchart indicated in FIG. 3.
Figure 4B:
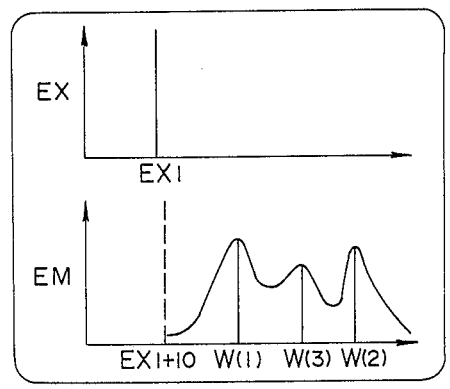
Figure 4C:
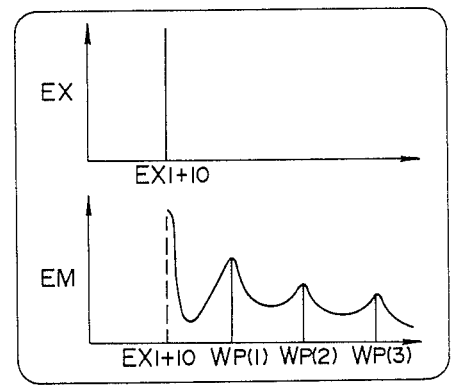
Figure 4D:
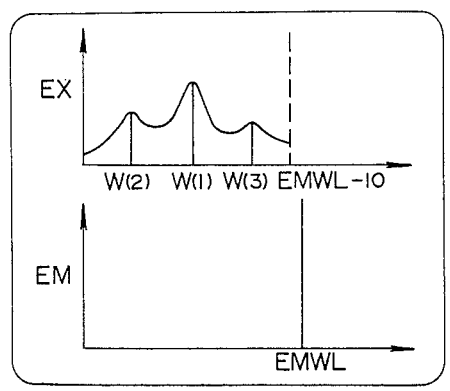
Figure 4E:
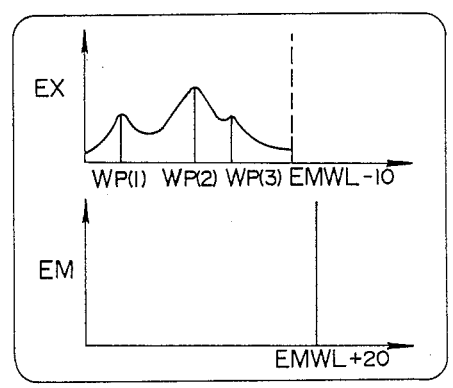
Figure 4F:
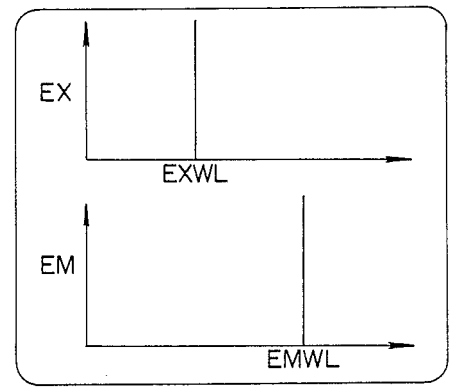

Although, in the above, the procedure has been explained for the case where both the excitation wavelength and the fluorescence wavelength are unknown, it is sufficient to search the wavelength only on the unknown side, in the case where either one of the wavelengths is known. The procedure in this case is as follows. If the wavelength is known on the excitation side, supposing that $EX_1 = EXWL$ in FIG. 4B, the content of FIGS. 4B and 4C is carried out. Further, in the case where it is known on the fluorescence side, it is sufficient to carry out the content of FIGS. 4D and 4E.

Figure 5:
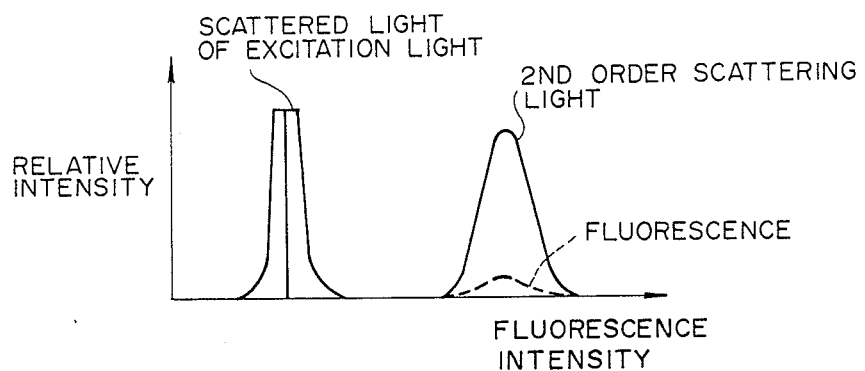
FIG. 5 shows a spectrum in the case where second order scattering light is superposed on the fluorescence.

Furthermore, in the case where the fluorescence wavelength is superposed on the wavelength of the second order scattering light, e.g. as indicated in FIG. 5, and it is not possible to identify the fluorescence wavelength by the content of the embodiment described above, the provisional excitation wavelength $EX_1$, which is the starting point for the embodiment described above, may be set at another wavelength and the content of FIG. 3 may be again carried out. This is because the wavelength of the second order scattering light and the fluorescence wavelength can be separated from each other owing to the fact that the former moves, while the latter doesn't move, when the excitation wavelength is moved. $EX_1$ at this time may be either the second peak wavelength or another following in the excitation spectrum (FIG. 4A) obtained when the fluorescence is set at the 0-th order or a value simply shifted from $EX_1$ in the embodiment stated above by an arbitrary wavelength.

As explained above, according to this invention, regardless of the amount of the fluorescence emitted by the sample, it is always possible to set the excitation and fluorescence wavelengths for the optimum wavelengths and thus to prevent erroneous operations due to the measurement wavelength setting. In this way an effect can be obtained that it is possible to simplify considerably the operation for setting the excitation and fluorescence wavelengths, which are the most basic measurement conditions for the fluorescence spectrophotometer, and to improve the reliability on the measurement result.

We claim:

1. A fluorescence spectrophotometer comprising:
   a light source;
   an excitation side spectroscope for separating light emitted by said light source in wavelength and projecting excitation light having a specified wavelength on a sample;
   a fluorescence side spectroscope for separating fluorescence emitted by said sample in wavelength;
   a detector for detecting light emitted by said fluorescence side spectroscope;
   means for storing a first spectrum, when either one of said spectroscopes is fixed to an arbitrary wavelength and the wavelength of the other is scanned;
   means for storing a second spectrum, when said one of the spectroscopes is fixed to another wavelength, which is different from said arbitrary wavelength, and the wavelength of the other is scanned; and
   means for comparing said first spectrum with said second spectrum and setting said excitation or fluorescence side wavelength for the wavelength when corresponding peaks in the two spectra are approximately in accordance with each other.

2. A fluorescence spectrophotometer comprising:
   a light source;
   an excitation side spectroscope for separating light emitted by said light source in wavelength and projecting excitation light having a specified wavelength on a sample;
   a fluorescence side spectroscope for separating fluorescence emitted by said sample in wavelength;
   a detector for detecting light emitted by said fluorescence side spectroscope;
   means for detecting the peak wavelength obtained when the wavelength of either one of said spectroscopes is fixed and the wavelength of the other is scanned;
   means for storing a first spectrum, when the other spectroscope is fixed to the detected peak wavelength and the wavelength of the one is scanned;
   means for storing a second spectrum, when said other spectroscope is fixed to another wavelength, which is different from said peak wavelength, and the wavelength of the one is scanned; and
   means for comparing said first spectrum with said second spectrum and setting said excitation or fluorescence side wavelength for the wavelength when corresponding peaks in the two spectra are approximately in accordance with each other.

3. A fluorescence spectrophotometer according to claim 1, wherein the wavelength when corresponding peaks in the two spectra are approximately in accordance with each other is a wavelength within a limit determined by the amount of shift in the Raman scattering wavelength due to said sample.

4. A fluorescence spectrophotometer according to claim 2, wherein the wavelength when corresponding peaks in the two spectra are approximately in accordance with each other is a wavelength within a limit determined by the amount of shift in the Raman scattering wavelength due to said sample.

5. A method for setting wavelength in a fluorescence spectrophotometer, by which excitation light having a specified wavelength is projected to a sample; fluorescence emitted by said sample is detected; and a measurement of said sample is effected; comprising steps of:
   fixing the wavelength of excitation light projected on said sample to a first wavelength (Steps 31, 32);
   measuring a first spectrum of the fluorescence emitted by said sample;
   fixing the wavelength of said excitation light to a second wavelength;
   measuring a second spectrum of the fluorescence emitted by said sample; and
   setting the wavelength when corresponding peaks in the two spectra are approximately in accordance with each other for the fluorescence wavelength emitted by said sample.

6. A method for setting wavelength in a fluorescence spectrophotometer, by which excitation light having a specified wavelength is projected to a sample; fluorescence emitted by said sample is detected; and a measurement of said sample is effected; comprising steps of:
   taking out a first wavelength of light emitted by said sample;
   measuring a first spectrum obtained by scanning continuously the wavelength projected on said sample;
   taking out a second wavelength of light emitted by said sample;
   measuring a second spectrum obtained by scanning continuously the wavelength projected on said sample; and
   setting the wavelength when corresponding peaks in the two spectra are approximately in accordance with each other for the fluorescence wavelength emitted by said sample.

7. A method for setting wavelength in a fluorescence spectrophotometer according to claim 5, further comprising steps of:
   taking out fluorescence emitted by said sample at said set fluorescence wavelength;
   measuring a third spectrum obtained by scanning continuously the wavelength of the excitation light projected on said sample;
   taking out a wavelength of light emitted by said sample, which is different from said fluorescence wavelength;
   measuring a fourth spectrum obtained by scanning continuously the wavelength of the excitation light projected on said sample; and
   setting the wavelength when corresponding peaks in the two spectra are approximately in accordance with each other for the excitation wavelength exciting said sample.

8. A method for setting wavelength in a fluorescence spectrophotometer according to claim 5, wherein the wavelength when corresponding peaks in the two spectra are approximately in accordance with each other is a wavelength within a limit determined by the amount of shift in the Raman scattering wavelength due to said sample.

9. A method for setting wavelength in a fluorescence spectrophotometer according to claim 6, wherein the wavelength when corresponding peaks in the two spectra are approximately in accordance with each other is a wavelength within a limit determined by the amount of shift in the Raman scattering wavelength due to said sample.

10. A method for setting wavelength in a fluorescence spectrophotometer according to claim 5, wherein the difference between said first and said second wavelengths is smaller than the amount of shift in the Raman scattering wavelength due to said sample.

11. A method for setting wavelength in a fluorescence spectrophotometer according to claim 6, wherein the difference between said first and said second wavelengths is smaller than the amount of shift in the Raman scattering wavelength due to said sample.

* * * * *